United States Patent
Deeter et al.

(10) Patent No.: US 8,785,558 B2
(45) Date of Patent: Jul. 22, 2014

(54) PROCESS FOR THE PRODUCTION OF CONDENSATION POLYMERS VIA IN-REACTOR CHAIN EXTENSION AND PRODUCTS THEREOF

(75) Inventors: Gary A. Deeter, Livonia, MI (US); Marco A. Villalobos, Carlisle, MA (US)

(73) Assignee: BASF Corporation, Florham Park, NJ (US)

( * ) Notice: Subject to any disclaimer, the term of this patent is extended or adjusted under 35 U.S.C. 154(b) by 0 days.

(21) Appl. No.: 13/384,743

(22) PCT Filed: Jul. 21, 2010

(86) PCT No.: PCT/US2010/042722
§ 371 (c)(1),
(2), (4) Date: Mar. 28, 2012

(87) PCT Pub. No.: WO2011/011498
PCT Pub. Date: Jan. 27, 2011

(65) Prior Publication Data
US 2012/0184678 A1    Jul. 19, 2012

Related U.S. Application Data

(60) Provisional application No. 61/227,149, filed on Jul. 21, 2009.

(51) Int. Cl.
*C08L 67/02* (2006.01)
(52) U.S. Cl.
USPC ........... 525/165; 525/178; 525/423; 525/438; 525/463; 525/533
(58) Field of Classification Search
USPC .................. 525/165, 178, 423, 438, 463, 533
See application file for complete search history.

(56) References Cited

U.S. PATENT DOCUMENTS

| 5,401,796 | A | * | 3/1995 | Kashima et al. | 524/706 |
| 5,420,170 | A | | 5/1995 | Lutter et al. | |
| 6,372,331 | B1 | * | 4/2002 | Terada et al. | 428/212 |
| 6,437,056 | B1 | | 8/2002 | Dahm et al. | |
| 2004/0138381 | A1 | | 7/2004 | Blasius et al. | |
| 2005/0227099 | A1 | * | 10/2005 | Hiruma | 428/480 |

FOREIGN PATENT DOCUMENTS

| CN | 1563138 A | 1/2005 |
| CN | 1622963 A | 6/2005 |
| CN | 102164983 A | 8/2011 |
| JP | 2009-079124 | 4/2009 |
| KR | 10200599510 | 10/2005 |
| WO | WO-03/066704 | 8/2003 |
| WO | WO-2004/067629 | 8/2004 |
| WO | WO-2010/034711 | 4/2010 |

OTHER PUBLICATIONS

Extended Search Report received in European Application No. 10802839.0 dated Nov. 15, 2012 (8 pages).
International Search Report and Written Opinion; In re: PCT International Patent Application No. PCT/US2010/042722; Mailed: Feb. 21, 2011; Applicant: BASF Corporation; (9 pgs.).
International Preliminary Report on Patentability issued for PCT/US2010/042722 and mailed Feb. 2, 2012.
Office Action received for Chinese Patent Application No. 201080041127.8 issued Jan. 13, 2014 (14 pages)—with English Translation.
Office Action received in Japanese Patent Application No. 2012-521749 issued Apr. 3, 2014 (8 pages)—with English Translation.

* cited by examiner

*Primary Examiner* — Robert Jones, Jr.
(74) *Attorney, Agent, or Firm* — Foley & Lardner LLP

(57) ABSTRACT

Methods for forming high molecular weight chain-extended condensation polymers are disclosed. The methods include adding a chain extender during the polymerization process of a condensation polymer to provide a chain-extended condensation polymer, wherein the chain extender comprises a polymerization product of at least one epoxy-functional (meth)acrylic monomer, and at least one styrenic and/or (meth)acrylic monomer.

11 Claims, 9 Drawing Sheets

D may be represented as

E may be represented as

D + E ⟹

PROCESS FOR THE PRODUCTION OF CONDENSATION POLYMERS VIA IN-REACTOR CHAIN EXTENSION AND PRODUCTS THEREOF

CROSS-REFERENCES TO RELATED APPLICATIONS

This application is a U.S. national stage application of International Application No. PCT/U.S.2010/042722, filed on Jul. 21, 2010, which in turn claims the benefit of U.S. Provisional Application No. 61/227,149, filed Jul. 21, 2009, the entire disclosure of which is incorporated herein by reference for any and all purposes.

BACKGROUND

Many condensation or step-growth polymers, including polyesters, polyamides, and polycarbonates, are widely used to make plastic products such as films, bottles, and other molded products. The mechanical and physical properties of these polymers are highly dependent on their molecular weights. Much effort has been placed on developing the next generation polycondensates by increasing molecular weight and introducing branching. However, increasing molecular weight during the initial polymerization process generally requires long reaction times and high temperatures, resulting in polymer degradation, poor application performance, and poor finished part appearance. Moreover, in many cases, reactor limitations restrict the maximum molecular weights that can be achieved during the initial polymerization process thereby limiting the range of applications of such polymers. Solid state polymerization (SSP) may be used to further process the synthesized polymer and increase molecular weight. However, SSP is time consuming and expensive.

Typically, polycondensation reactions are reversible and subject to dynamic equilibrium at higher reactive group conversion and polycondensate molecular weight. Constant removal of condensation product(s) becomes necessary in order to displace equilibrium towards products thus enhancing forward reaction rates, increasing product molecular weight and reactor productivity. Operation at high temperatures and extreme vacuum conditions are necessary to eliminate condensation products from the reaction mix, to achieve higher molecular weights (or intrinsic viscosity, I.V.) in a suitable time. Given the asymptotic nature of the polycondensate molecular weight increase with reaction time, attempts to produce higher molecular weight products result in longer reaction times, decreases in reactor productivity, and added energy and labor costs. Higher molecular weights are desirable for higher product performance, yet unattainable economically with the current art. Moreover, it is known in the art that extended polymerization times lead to a variety of degradation by-products that affect the performance and appearance of these products.

SUMMARY

In one aspect, methods for making condensation polymers are provided. The methods involve adding certain polymeric chain extenders during the polymerization process of the condensation polymer to provide a chain-extended condensation polymer. The methods are capable of reducing the polymerization times and/or increasing the molecular weight for the chain-extended condensation polymer as compared to the polymerization times for the condensation polymer formed in the absence of the chain extenders. In other words, the methods provide chain-extended condensation polymers having high molecular weights using shorter polymerization times than previously possible. Consequently, such methods increase the efficiency and capacity of polymerization plants employing the methods, resulting in significant cost savings. Similarly, because polymerization times are reduced, it is possible to avoid one or more of the polymer degradation, poor application performance, and poor finished part appearance associated with polymers formed using conventional methods having long reaction times and high temperatures.

Because the disclosed methods provide chain-extended condensation polymers having high molecular weights, the methods may eliminate the need for further processing of the chain-extended polymers using solid state polymerization (SSP). However, if SSP is used, the methods are capable of reducing the SSP polymerization times for the processed, chain-extended condensation polymers as compared to the SSP polymerization times for the processed, condensation polymer formed in the absence of the chain extenders.

As noted above, the methods involve adding a chain extender during the polymerization process of a condensation polymer to provide a chain-extended condensation polymer. The chain extender includes a polymerization product of at least one functional (meth)acrylic monomer and at least one styrenic and/or (meth)acrylic monomer.

In one aspect, a method is provided including adding a chain extender during the polymerization process of a condensation polymer to provide a chain-extended condensation polymer, wherein the chain extender includes a polymerization product of at least one functional (meth)acrylic monomer, and at least one styrenic and/or (meth)acrylic monomer. In some embodiments, the at least one functional (meth)acrylic monomer includes at least one functional group selected from an epoxy group, an anhydride group, a carboxylic acid group, and a hydroxyl group. In some embodiments, the chain extender has a functionality of 2 or more. In some embodiments, the chain extender has a functionality of from 2 to 30. In some embodiments, the chain extender has a functionality of greater than 2. In some embodiments, the chain extender has a functionality of greater than 2, but less than or equal to 30. In some embodiments, the functional (meth)acrylic monomer is an epoxy-functional (meth)acrylic monomer. In some embodiments, the epoxy-functional (meth)acrylic monomer is glycidyl methacrylate.

In other embodiments, the styrenic monomer is styrene and the (meth)acrylic monomer is selected from butyl acrylate, 2-ethylhexyl acrylate, or methyl(meth)acrylate. In some embodiments, the at least one functional (meth)acrylic monomer is present in an amount of about 0.5% to about 75% by weight of the total weight of the monomers in the chain extender. In some embodiments, the at least one styrenic and/or (meth)acrylic monomer is present in an amount of about 95.5% to about 25% by weight of the total weight of the monomers in the chain extender. In some embodiments, the chain extender is added to the condensation polymer in an amount of about 0.03% to about 10% by weight of the total weight of the chain extender and the components of the condensation polymer.

In other embodiments, the condensation polymer is selected from polyesters, polyamides, or polycarbonates. In some embodiments, the condensation polymer is a polyester. In some embodiments, the condensation polymer is a bio-polyester. In some embodiments, the bio-polyester is selected from poly(lactic acid), poly(2-hydroxybutyric acid), or other biopolyesters including the polymerization products of monomers with the general formula $CH_3-CH(OH)-(CH_2)_n-COOH$ or $CH_2(OH)-(CH_2)_n-COOH$, where n is greater than, or equal to, one. For example, in some embodiments, n is from one to about 20. In other embodiments, n is from one to about 10. In some embodiments, the polyester is selected from poly(ethylene terephthalate), poly(butylene terephthalate), poly(ethylene naphthalate), or poly(butylene naphthalate), poly(lactic acid), poly(2-hydroxybutyric acid), or other poly(hydroxyalkyl acid) per the general formula of $CH_3$—$CH(OH)$—$(CH_2)_n$—$COOH$ or $CH_2(OH)$—$(CH_2)_n$—$COOH$.

In another aspect, a method is provided including, adding a chain extender during the polymerization process of a polyester to provide a chain-extended polyester, wherein the chain extender includes a polymerization product of at least one epoxy-functional (meth)acrylic monomer, and at least one styrenic and/or (meth)acrylic monomer. In some embodiments, the chain extender is added when the solution intrinsic viscosity of the condensation polymer is no more than about 0.6 dL/g. In some embodiments, a molecular weight of the chain-extended condensation polymer is achieved in a time that is less than the time to achieve the molecular weight in the absence of the chain extender. In some embodiments, the time is at least about 10% less. In some embodiments, a solution intrinsic viscosity of at least about 0.6 dl/g of the chain-extended condensation polymer is achieved in a time of 90 minutes or less.

In some embodiments, the method does not include processing the chain-extended condensation polymer via solid state polymerization. In some embodiments, the method further includes processing the chain-extended condensation polymer via solid state polymerization. In some embodiments, a molecular weight of the processed, chain-extended condensation polymer is achieved in a time that is less than the time to achieve the molecular weight in the absence of the chain extender. In some embodiments, the time is at least about 5% less than the time to achieve the molecular weight in the absence of the chain extender. In some embodiments, a solution intrinsic viscosity of at least about 0.8 dl/g of the processed, chain-extended condensation polymer is achieved in a time of 15 hours or less. In some embodiments, the chain-extended condensation polymer exhibits a greater melt viscosity than a condensation polymer formed in the absence of the chain extender. In some embodiments, the chain-extended condensation polymer exhibits a higher viscosity at low shear rates and a lower viscosity at high shear rates than a condensation polymer formed in the absence of the chain extender. In some embodiments, the chain-extended condensation polymer exhibits a higher viscosity at shear rates below about 200 $s^{-1}$ and a lower viscosity at shear rates above about 500 $s^{-1}$ as compared with a condensation polymer formed in the absence of the chain extender.

In another aspect, a method is provided including adding a chain extender during the polymerization process of a polyester to provide a chain-extended polyester, wherein the chain extender comprises a polymerization product of at least one epoxy-functional (meth)acrylic monomer, and at least one styrenic, a (meth)acrylic monomer, or a mixture thereof; where the polymerization process is a batch polymerization process or a continuous polymerization process; the chain extender is added when the solution intrinsic viscosity of the condensation polymer is no more than about 0.6 dL/g; and a molecular weight of the chain-extended condensation polymer is achieved in a time that is less than the time to achieve the molecular weight in the absence of the chain extender. In some embodiments, the time is at least about 10% less. In some embodiments, a solution intrinsic viscosity of at least about 0.6 dl/g of the chain-extended condensation polymer is achieved in a time of 90 minutes or less. In some embodiments, a solution intrinsic viscosity of at least about 0.8 dl/g of the processed, chain-extended condensation polymer is achieved in a time of 15 hours or less. In some embodiments, the method does not comprise processing the chain-extended condensation polymer via solid state polymerization. In some embodiments, the chain-extended condensation polymer exhibits a greater melt viscosity than a condensation polymer formed in the absence of the chain extender. In some embodiments, the chain-extended condensation polymer exhibits a higher viscosity at low shear rates and a lower viscosity at high shear rates than a condensation polymer formed in the absence of the chain extender. In some embodiments, the chain extender has a functionality of 2 or more. In some embodiments, the epoxy-functional (meth)acrylic monomer is glycidyl methacrylate. In some embodiments, the styrenic monomer is styrene, and the (meth)acrylic monomer is butyl acrylate, 2-ethylhexyl acrylate, or methyl (meth)acrylate. In some embodiments, at least one functional (meth)acrylic monomer is present in an amount of about 0.5% to about 75% by weight of the total weight of the monomers in the chain extender. In some embodiments, the at least one styrenic and/or (meth)acrylic monomer is present in an amount of about 95.5% to about 25% by weight of the total weight of the monomers in the chain extender. In some embodiments, the chain extender is added to the condensation polymer in an amount of about 0.03% to about 10% by weight of the total weight of the chain extender and the components of the condensation polymer. In some embodiments, the condensation polymer is selected from polyesters, polyamides, polycarbonates, or a bio-polyester.

In another aspect, chain-extended condensation polymers made by any of the disclosed methods are also provided. Due to the reduction in polymerization times (including SSP polymerization times), the chain-extended condensation polymers (including SSP processed, chain-extended condensation polymers) have minimal amounts of by-products normally associated with conventional of high molecular weight condensation polymers. Despite the increased branching associated with certain of the chain-extended condensation polymers, the mechanical and thermal properties of these polymers are surprisingly similar to those of condensation polymers formed in the absence of the chain extenders when at the same target molecular weight (or I.V.). However, the chain-extended condensation polymers exhibit unique rheological properties as compared to condensation polymers formed in the absence of the chain extender. These properties are further described below.

DETAILED DESCRIPTION

Figure 1:
FIG. 1 illustrates an idealized reaction scheme involving PET (D) and an epoxy-functional styrene, acrylic oligomer (E), which react to provide the chain-extended PET (F), according to one embodiment. For the chain extender Chain Extender 1 (see Table 3), x equals 65 to 70 (IV=0.4 dL/g and Mn=14,000), y is equal to 10.8, and z is equal to 5.9. Ep=epoxy group.
Figure 1:
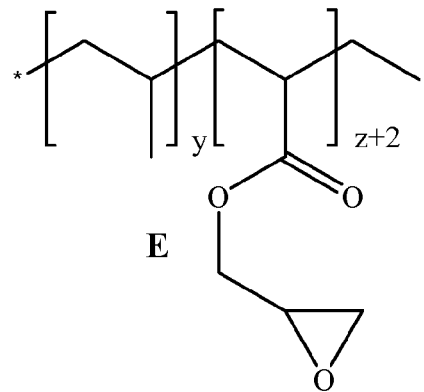
Figure 1:
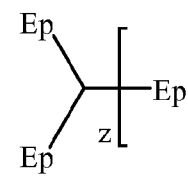
Figure 1:
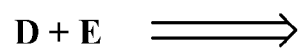
Figure 1:
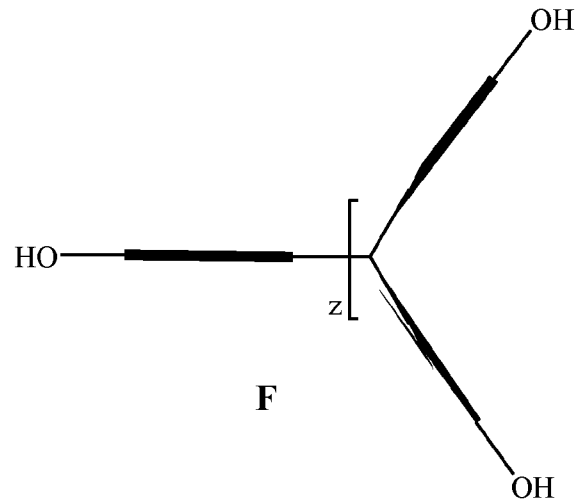

Provided are methods for making high molecular weight, chain-extended condensation polymers and the chain-extended condensation polymers formed from these methods. The methods include adding a chain extender during the polymerization process of a condensation polymer to provide a chain-extended condensation polymer. The chain extender includes a polymerization product of at least one functional (meth)acrylic monomer and at least one styrenic and/or (meth)acrylic monomer. The phrase "in-reactor chain extension" is also used herein to refer to the method of adding any of the disclosed chain extenders during the polymerization process of a condensation polymer to provide a chain-extended condensation polymer.

Chain Extenders

As noted above, the disclosed chain extenders include a polymerization product of at least one functional (meth) acrylic monomer and at least one styrenic and/or (meth) acrylic monomer. Regarding the functional (meth)acrylic monomer, a variety of functional groups may be used. In some embodiments, the functional group is selected from an epoxy group, an anhydride group, a carboxylic acid group, and a hydroxyl group. The use of a particular functional group can depend upon the identity of the condensation polymer. For example, certain polyesters include aliphatic hydroxyl and/or aromatic or aliphatic carboxylic acid chain ends. Functional (meth)acrylic monomers having epoxy groups, anhydride groups, or carboxylic acid groups are capable of reacting with such polyesters. Polycarbonates include phenolic chain ends. Functional (meth)acrylic monomers having epoxy groups, anhydride groups, or carboxylic acid groups are capable of reacting with such polycarbonates. Polyamides include amine and carboxylic acid chain ends. Functional (meth)acrylic monomers having epoxy groups, anhydride groups, or carboxylic acid groups, are capable of preferentially reacting with amine chain ends; functional (meth) acrylic monomers having hydroxyl groups are capable of reacting with the carboxylic acid chain ends; and functional (meth)acrylic monomers having epoxy groups are capable of reacting with both types of chain ends.

Examples of carboxyl-containing radically-polymerizable monomers include, but are not limited to, acrylic acid, methacrylic acid, and maleic acid. Examples of anhydride-containing radically-polymerizable monomers include, but are not limited to, maleic anhydride, itaconic anhydride and citraconic anhydride. Hydroxy-containing radically-polymerizable monomers that can be used in the process include, but are not limited to, hydroxy acrylates and methacrylates such as 2-hydroxy ethyl methacrylate, 2-hydroxy ethyl acrylate, hydroxy propyl acrylate, 3-chloro-2-hydroxy-propyl acrylate, 2-hydroxybutyl acrylate, 6-hydroxyhexyl acrylate, 2-hydroxymethyl methacrylate, 2-hydroxypropyl methacrylate, 6-hydroxyhexyl methacrylate, and 5,6-dihydroxyhexyl methacrylate. Examples of amine-containing radically-polymerizable monomers include, but are not limited to, 2-(diethylamino)ethyl acrylate, 2-(dimethylamino) ethyl acrylate, 2-(dimethylamino)propyl acrylate, 2-(diethylamino)ethyl methacrylate, 2-(dimethylamino)ethylmethacrylate, 2-dimethylamino)propyl acrylate. Still other radically-polymerizable monomers containing condensation reactive functionalities include amides such as acrylamide, N-ethyl acrylamide, N,N-diethyl acrylamide methacrylonitrile, methacrylamide, N-methyl methacrylamide, N-ethyl methacrylamide, N,N-diethyl methacrylamide, N,N-dimethyl methacrylamide, and N-phenyl methacrylamide.

In some embodiments, the functional group is an epoxy group and the functional (meth)acrylic monomer is an epoxy-functional (meth)acrylic monomer. As used herein, the term epoxy-functional includes both epoxides and functional equivalents of such materials, such as oxazolines. Examples of epoxy-functional (meth)acrylic monomers include, but are not limited to, those containing 1,2-epoxy groups such as glycidyl acrylate and glycidyl methacrylate. Other suitable epoxy-functional monomers include allyl glycidyl ether, glycidyl ethacrylate, glycidyl itoconate, and other glycidyl (meth)acrylates The functionality of the disclosed chain extenders may vary. The chain extenders are characterized by having a broad range of epoxy equivalent weight (EEW) values from moderately low to very high. In some embodiments, the functionality of the chain extenders is 2 or greater. In other embodiments, the functionality of the chain extenders is greater than 2. Such multifunctional chain extenders are capable of reacting with certain groups on the disclosed condensation polymers, leading to an increased rate of linear chain growth if the functionality equals 2, or branching if the functionality is greater than 2. By way of example only, epoxy-functional (meth)acrylic monomers are capable of reacting with the hydroxyl (OH) and/or carboxylic acid (COOH) ends of a polyester. FIG. 1 illustrates an exemplary reaction between poly(ethylene terephthalate) (D) and an exemplary epoxy-functional chain extender (E) to form a chain-extended polyester (F). In certain embodiments, the epoxy-functional (meth)acrylic monomers react preferentially with carboxylic acid groups and have a functionality greater than 2, predominantly leading to chain branching as shown in FIG. 1.

Regarding the (meth)acrylic monomers, the term (meth) acrylic includes both acrylic and methacrylic monomers. Examples of (meth)acrylic monomers include both acrylates and methacrylates. Suitable acrylate and methacrylate monomers for use in the chain extenders include, but are not limited to, methyl acrylate, ethyl acrylate, n-propyl acrylate, i-propyl acrylate, n-butyl acrylate, s-butyl acrylate, i-butyl acrylate, t-butyl acrylate, n-amyl acrylate, i-amyl acrylate, isobornyl acrylate, n-hexyl acrylate, 2-ethylbutyl acrylate, 2-ethylhexyl acrylate, n-octyl acrylate, n-decyl acrylate, methylcyclohexyl acrylate, cyclopentyl acrylate, cyclohexyl acrylate, methyl methacrylate, ethyl methacrylate, n-propyl methacrylate, n-butyl methacrylate, i-propyl methacrylate, i-butyl methacrylate, n-amyl methacrylate, n-hexyl methacrylate, i-amyl methacrylate, s-butyl-methacrylate, t-butyl methacrylate, 2-ethylbutyl methacrylate, methylcyclohexyl methacrylate, cinnamyl methacrylate, crotyl methacrylate, cyclohexyl methacrylate, cyclopentyl methacrylate, 2-ethoxyethyl methacrylate, isobornyl methacrylate, and mixtures of these species. In some embodiments, the (meth)acrylic monomers are butyl acrylate, 2-ethylhexyl acrylate, methyl methacrylate, or combinations thereof.

Regarding the styrenic monomers, suitable monomers, include, but are not limited to, styrene, α-methyl styrene, vinyl toluene, p-methyl styrene, t-butyl styrene, o-chlorostyrene, vinyl pyridine, and mixtures of these species. In some embodiments, the styrenic monomer is styrene.

The disclosed chain extenders may include various amounts of the functional (meth)acrylic monomer and the styrenic and/or (meth)acrylic monomers. In some embodiments, the at least one functional (meth)acrylic monomer is present in an amount of about 0.5% to about 75% by weight of the total weight of the monomers in the chain extender. This includes embodiments in which the at least one functional (meth)acrylic monomer is present in an amount of about 10% to about 70%, about 15% to about 60%, or about 20% to about 50%. However, other amounts are possible. In some embodiments, the at least one styrenic and/or (meth)acrylic monomer is present in an amount of about 95.5% to about 25% by weight of the total weight of the monomers in the chain extender. This includes embodiments in which the at least one styrenic and/or (meth)acrylic monomer is present in an amount of about 90% to about 30%, about 80% to about 40%, or about 70% to about 50%. However, other amounts are possible.

Similarly, the molecular weight of the chain extenders may vary. In some embodiments, the number average molecular weight of the chain extenders may range from about 1,000 to 10,000. This includes embodiments in which the molecular weight ranges from about 1,500 to about 5,000, from about 2,000 to about 7,000, or from about 3,000 to about 9,000. However, other molecular weights are possible. In some embodiments, the weight average molecular weight of the chain extenders may range from about 1,500 to 35,000. This includes embodiments in which the molecular weight ranges from about 2,500 to about 15,000, from about 5,000 to about 20,000, or from about 10,000 to about 30,000. However, other molecular weights are possible.

For chain extenders having epoxy groups, the desired epoxy equivalent weight (EEW) is fixed by the desired content of the epoxy-functional (meth)acrylic monomer employed. Additionally, at a given EEW, the number average epoxy functionality per chain (Efn) can be tailored from very low (e.g., <1) to very high (e.g., >30) by controlling the number average molecular weight ($M_n$) of the chain extender. Moreover, for a given EEW the weight average epoxy functionality per chain (Efw) can be designed by altering the polydispersity index (PDI) of the chain extender (PDI=Mw/Mn=Efw/Efn) through changes in composition, processing conditions, and molecular weight. PDI can be tailored from very low (e.g., about 1.5) to very high (e.g., about 5).

Other chain extenders may be used, including, but not limited to those described in U.S. Pat. Nos. 6,552,144, 6,605,681 and 6,984,694 which are hereby incorporated by reference in their entirety.

The disclosed chain extenders may be produced according to standard techniques known in the art. Such techniques include, but are not limited to, known high temperature, free radical continuous polymerization processes. Briefly, these processes involve continuously charging into a reactor at least one functional (meth)acrylic monomer, at least one styrenic and/or (meth)acrylic monomer, and optionally at least one free radical polymerization initiator. The proportion of monomers charged into the reactor may be the same as those proportions that go into the chain extenders discussed above.

The reactor may also optionally be charged with at least one free radical polymerization initiator. Briefly, the initiators suitable for carrying out the process are compounds which decompose thermally into radicals in a first order reaction, although this is not a critical factor. Suitable initiators include those with half-life periods in the radical decomposition process of about 1 hour at temperatures greater or equal to 90° C. and further include those with half-life periods in the radical decomposition process of about 10 hours at temperatures greater than, or equal to, 100° C. Others with about 10 hour half-lives at temperatures significantly lower than 100° C. may also be used. Suitable initiators, include, but are not limited to aliphatic azo compounds such as 1-t-amylazo-1-cyanocyclohexane, azo-bis-isobutyronitrile and 1-t-butylazo-cyanocyclohexane, 2,2'-azo-bis-(2-methyl)butyronitrile and peroxides and hydroperoxides, such as t-butylperoctoate, t-butyl perbenzoate, dicumyl peroxide, di-t-butyl peroxide, t-butyl hydroperoxide, cumene hydroperoxide, di-t-amyl peroxide and the like. Additionally, di-peroxide initiators may be used alone or in combination with other initiators. Such di-peroxide initiators include, but are not limited to, 1,4-bis-(t-butyl peroxycarbo)cyclohexane, 1,2-di(t-butyl peroxy)cyclohexane, and 2,5-di(t-butyl peroxy)-3-hexyne, and other similar initiators.

The initiator may be added with the monomers and may be added in any appropriate amount. By way of example only, the total initiators are added in an amount of about 0.0005 to 0.06 moles initiator(s) per mole of monomers in the feed. For this purpose, the initiator may be admixed with the monomer feed or added to the process as a separate feed.

The reactor may also optionally be charged with one or more solvents fed into the reactor together with the monomers, or in a separate feed. The solvent may be any solvent known in the art, including those that do not react with the functional group on the functional (meth)acrylic monomer at the high temperatures of the continuous process described herein. The proper selection of solvent may help decrease or eliminate the gel particle formation during the continuous, high temperature reaction. Such solvents include, but are not limited to xylene; toluene; ethyl-benzene; Aromatic-100®, Aromatic 150®, Aromatic 200®, all of which are available from Exxon; acetone; methylethyl ketone; methyl amyl ketone; methyl-isobutyl ketone; n-methylpyrrolidinone; and combinations of any two or more such solvents. When used, the solvents are present in any amount desired, taking into account reactor conditions and monomer feed. In one embodiment, one or more solvents are present in an amount of up to 40% by weight, or up to 15% by weight, in other embodiments, based on the total weight of the monomers.

The reactor is maintained at an effective temperature for an effective period of time to cause polymerization of the monomers to produce the polymerized chain extender. Regarding the effective temperature, the continuous polymerization is carried out at high temperatures. In one embodiment, the polymerization temperatures range from about 160° C. to about 270° C. This includes embodiments where the temperatures range from about 170° C. to about 250° C. or from about 170° C. to about 232° C. This also includes embodiments where the temperatures range from about 175° C. to about 250° C. or from about 180° C. to about 232° C. Regarding the effective period of time, a continuous polymerization process allows for a short residence time within the reactor. The residence time is generally less than about one hour, and may be less than about 15 minutes. In some embodiments, the residence time is generally less than about 30 minutes, and may be less than about 20 minutes.

The process for producing the chain extenders may be conducted using any type of reactor known in the art, and may be set up in a continuous configuration. Such reactors include, but are not limited to, continuous stirred tank reactors ("CSTRs"), tube reactors, loop reactors, extruder reactors, or any reactor suitable for continuous operation.

A form of CSTR which has been found suitable for producing the chain extenders is a tank reactor provided with cooling coils and/or cooling jackets sufficient to remove any heat of polymerization not taken up by raising the temperature of the continuously charged monomer composition so as to maintain a preselected temperature for polymerization therein. Such a CSTR may be provided with at least one, and usually more, agitators to provide a well-mixed reaction zone. Such a CSTR may be operated at varying filling levels from 10 to 100% full (liquid full reactor LFR). In one embodiment, the reactor is 100% liquid full.

Condensation Polymers

As noted above, the disclosed methods involve adding any of the described chain extenders to a condensation polymer to provide a chain-extended condensation polymer. Suitable condensation polymers include, but are not limited to, polyesters (PEs), polyamides (PAs), and polycarbonates (PCs).

Polyesters include, but are not limited to, homo- or copolyesters that are derived from aliphatic, cycloaliphatic or aromatic dicarboxylic acids and diols or hydroxycarboxylic acids. Non-limiting, exemplary polyesters include poly(ethylene terephthalate) (PET), poly(butylene terephthalate) (PBT), poly(ethylene naphthalate) (PEN), and poly(butylene naphthalate). The application of these and other polyesters is broad and includes textile fibers, food packaging, beverage containers, electrical connectors and housings, tire cord, etc.

Polyamides include, but are not limited to, polyamides produced by polycondensing a dicarboxylic acid with a diamine, polyamides produced by polymerizing a cyclic lactam, and polyamides produced by co-polymerizing a cyclic lactam with a dicarboxylic acid/diamine salt. The polyamides include polyamide elastomer resins. Suitable polyamide elastomer resins include nylon 6, nylon 6-6, nylon 6-10, nylon 11, nylon 12, and co-polymers and blends of any two or more such polyamides.

Polycarbonates include, but are not limited to, aromatic polycarbonates produced by reactions of bisphenols with carbonic acid derivatives such as those made from bis-phenol A (2,2-bis(4-hydroxyphenyl)propane) and phosgene or diphenyl carbonate. Various modified polycarbonates and copolycarbonates made from other types of bisphenols, such as those in which phenolic radicals in the para position are bridged via C, O, S or alkylene, are also included. Polyestercarbonates made from one or more aromatic dicarboxylic acids or hydroxycarboxylic acids, bisphenols and carbonic acid derivatives are also included. Polycarbonate resins may also be prepared from bis-phenol A and carbonic acid derivatives.

In some embodiments, the condensation polymer is a polyester. In some such embodiments, the condensation polymer is selected from poly(ethylene terephthalate), poly(butylene terephthalate), poly(ethylene naphthalate), or poly(butylene naphthalate). In some embodiments, the condensation polymer is poly(ethylene terephthalate) (PET). Scheme 1 shows a representative batch polycondensation scheme for PET.

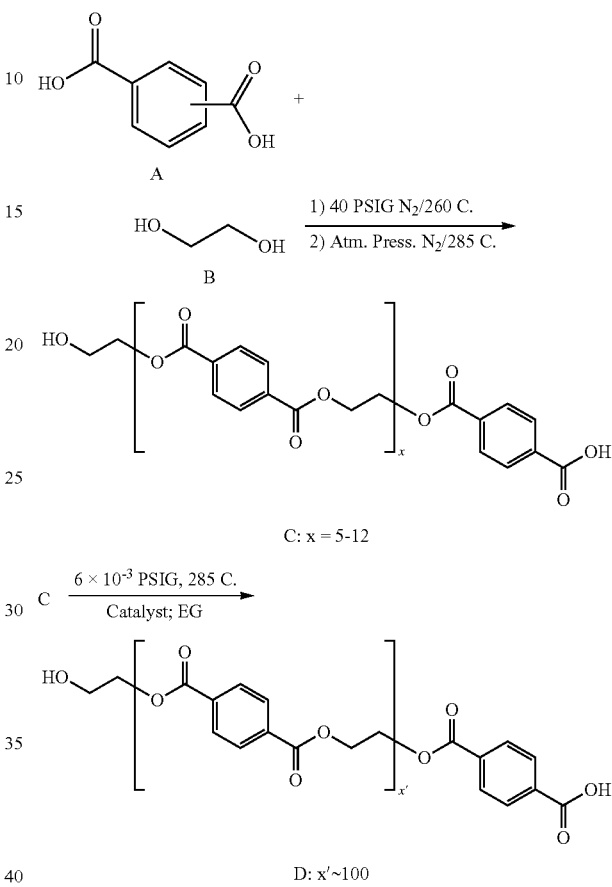

The raw materials used in the polymerization of PET are a mixture of aromatic diacids (A) [terephthalic acid (PTA; 1,4-substitution) and isophthalic acid (IPA; 1,3-substitution)] and ethylene glycol (B). The aromatic diacid (A) mol ratio is manipulated to control crystallinity. The diacid (A) to glycol (B) mol ratio is adjusted to minimize deleterious side reactions, tailor polymer properties, and maximize production efficiency. The polymerization process consists of two stages. Stage 1 is esterification or pre-polycondensation (Equation 1), which can be separated into pressurized and ambient esterification. Early in stage 1, high pressures are used to prevent glycol loss to maintain stoichiometry. Once the glycol is reacted, the pressure is relaxed and water removed. Stage 1 yields PET oligomers consisting of five to twelve repeat units (C). Stage 2 is polycondensation (Equation 2) and uses very high vacuum and temperature and catalysts. Table 1 lists the catalyst and preservative package, the aromatic diacid (A) to glycol (B) mol ratios, and the PTA to IPA mol ratios used in the Examples described below. Tetramethyl ammonium hydroxide (TMAH) was used to prevent polyethylene glycol formation, antimony trioxide ($Sb_2O_3$) was used as a polymerization catalyst, cobalt [II] acetate tetrahydrate was added to reduce color, and phosphoric acid as an antioxidant to improve color and thermal stability.

TABLE 1

PET formula details.

| Reagent | Mol ratio |
| --- | --- |
| glycol (B)/acid (A) | 1.15 |
| PTA/IPA | 2.8 |

| Catalysts | ppm |
| --- | --- |
| TMAH | 40 |
| $Sb_2O_3$ | 250 |
| $(CH_3COO)_2Co \cdot 4H_2O$ | 30 |
| Phosphoric Acid | 30 |

PTA—terephthalic acid;
PIA—isophthalic acid;
TMAH—tetramethyl ammonium hydroxide;
$Sb_2O_3$ —Antimony [III] oxide;
$(CH_3COO)_2Co$ [II]—Cobalt [II] Acetate tetrahydrate.

It is known that because of reactor limitations, PET is prepared to a solution intrinsic viscosity (SIV) of approximately 0.6 dL/g, which is equivalent to a molecular weight between 25,000 and 30,000. In the majority of situations, solid state polymerization (SSP) is required to achieve the molecular weights needed for PET applications. Table 2 provides the SIV requirements for several PET applications. This data suggests that only lower end fiber and film applications may not require solid state polymerization to achieve the molecular weights needed for performance.

TABLE 2

PET SIV requirements.

| Application | SIV (dL/g) |
| --- | --- |
| Fiber/Film | 0.60-0.68 |
| Sheet/Tape | 0.65-0.78 |
| Bottles | 0.70-0.85 |
| General Purpose Strapping | 0.65-0.85 |
| High Temperature Strapping/Tire Cord | >0.90 |

SIV—solution intrinsic viscosity.

Other limitations to PET and its production are over-capacity, limited product differentiation, and the demise of the textile fiber industry in North America. As further described below, the disclosed methods are capable of reducing polymerization times, thereby increasing production capacity and efficiency; increasing product differentiation through property enhancement associated with branching; and eliminating the need for costly SSP.

In some embodiments, the condensation polymer is a polyamide. Polyamides can be produced by batch or continuous polymerization processes. The chain extenders can also be used with polyamides.

In some other embodiments, the condensation polymer is a polycarbonate. Polycarbonates can be produced by batch or continuous polymerization processes. The chain extenders can also be used with polycarbonates.

In-Reactor Chain Extension

As noted above, in the disclosed methods, any of the described chain extenders are added to any of the described condensation polymers during the polymerization process of the condensation polymer to provide a chain-extended condensation polymer. The phrase "during the polymerization process" means during the initial synthesis process by which the condensation polymers are formed. This phrase excludes adding the chain extenders before, or during, subsequent processing of the polymerized condensation polymers, such as processing by SSP. Methods in which chain extenders are added before or during a subsequent processing step, such as SSP, are possible, but such methods are described separately below.

Polymerization processes of the described condensation polymers are known. The polymerization process may be a batch polymerization process or a continuous polymerization process. An exemplary batch polymerization process for PET has been described above and shown in Scheme 1. Similarly, methods (e.g., reactors and reactor conditions) for carrying out these polymerization processes are also known. An exemplary polymerization process for PET is further described in the Examples below.

The disclosed chain extenders may be added at various times during the polymerization process of the condensation polymers. In those embodiments in which the polymerization process is a batch polymerization process, the chain extenders may be added during the pre-polycondensation stage, the polycondensation stage, or both. In some embodiments, the chain extenders are added during the polycondensation stage.

In other embodiments, the chain extenders are added at the point during the polymerization process at which the condensation polymers have achieved a particular solution intrinsic viscosity (SIV). This SIV may vary. In some embodiments, the chain extender is added when the SIV of the condensation polymer is no more than about 0.6 dL/g. In other embodiments, the chain extender is added when the SIV of the condensation polymer is no more than about 0.5 dL/g, 0.4 dL/g, or 0.3 dL/g. However, other SIVs are possible. Adding the chain extenders while the SIV of the condensation polymer is relatively low may be useful because the processing temperatures tend to be lower (decreasing degradation) and it is easier to thoroughly mix the chain extenders (increasing reaction efficiency). In addition, when the SIV of the condensation polymer is relatively low, the concentrations of the reactive end groups of the condensation polymers are relatively high (increasing reaction efficiency).

The chain extenders can also be used in various continuous polymerization processes for making condensation polymers. For example, the chain extenders can be added to the inlet stream of a continuous melt polymerization reactor after the esterification reactor. Also, and more preferably, chain extender can be continuously added into an intermediate reactor location when available in the continuous melt polymerization reactor. This is equivalent to adding it at some intermediate point during the batch melt polymerization time. Ideally, in either case the chain extender should be added at a suitable time or reactor place when the SIV of the material in the melt polymerization reactor is between about 0.20 and 0.55, between about 0.25 and 0.50, between about 0.30 and 0.45, or between about 0.35 and 0.45, according to various embodiments.

The chain extenders may be added to the condensation polymers at various amounts. In some embodiments, the chain extenders are added in an amount ranging from about 0.03% to about 10% by weight of the total weight of the chain extender and the components of the condensation polymer. By "components of the condensation polymer," it is meant the components that are added to the feed to produce the condensation polymer. This includes embodiments in which the amount ranges from about 0.05% to about 5%, from about 0.075% to about 3%, and from about 0.1% to about 1%. However, other amounts are possible. The particular amount depends upon the identity of the chain extender, the identity of the condensation polymer, and the desired amount of molecular weight gain and/or branching.

Other Processing Steps

The methods may further include additional processing of the chain-extended polymers after in reaction chain extension as has been performed as described above, although not necessarily. In some embodiments, the methods further include processing the chain-extended condensation polymer via SSP. Suitable reactors and reactor conditions for SSP are known. In such embodiments, additional chain extenders may be added to the chain-extended polymers prior to or during the SSP processing. As used herein, the phrase "processed, chain-extended condensation polymer" is used to refer to a condensation polymer that has been subjected to both in-reactor chain extension and SSP.

In other embodiments, the methods do not include processing the chain-extended condensation polymer via SSP. As noted above and further described below, because the disclosed reactor chain extension methods are capable of providing chain-extended condensation polymers having high molecular weights, further processing of the chain-extended polymers using SSP may be eliminated. This allows the manufacturing of some types of food containers (bottles) without the need for SSP.

The methods may further include a variety of plastic forming operations, including, but not limited to injection-blow molding, extrusion-blow molding, sheet and film extrusion, injection molding, thermoforming, film-blowing, and fiber spinning Apparatuses and processing conditions for these operations are known. Any of the methods may also be followed by a polymer recovery and a pelletization stage to obtain pellets or granules of the chain-extended or processed, chain-extended condensation polymer.

Processing

The disclosed methods provide a number of processing advantages compared to conventional methods of forming condensation polymers. As noted above, the disclosed methods are capable of reducing the polymerization times for the chain-extended condensation polymers as compared to the polymerization times for condensation polymers formed in the absence of the chain extenders. However, it is noted that the disclosed chain extenders do not affect polymerization reaction kinetics—i.e., the chain extenders are not catalysts. During melt polymerization, chain extension occurs regardless of the specific catalyst system employed. For example, in the preparation of polyester, metal-based oxides are traditionally employed as catalysts. Metal-based oxides of antimony, titanium, aluminum, zirconium, germanium, and other metals may be used as the catalyst. Because the chain extension described here is not based upon catalytic mechanisms, chain extension occurs independently of the polyester formation. The same is true for the preparation of bio-polyesters, polyamides and polycarbonate reaction systems.

Rather, as further explained in the Examples below, the chain extenders dramatically increase the instantaneous molecular weight of the condensation polymers upon addition of the chain extenders. Thus, using the disclosed methods, it is possible to achieve a molecular weight of the chain-extended condensation polymer in a time that is less than the time to achieve the molecular weight in the absence of the chain extender. By "time" it is meant the time of residence in the polymerization reactor regardless of the type of operation (batch, semi-continuous, or continuous). In some embodiments, the time is at least about 10% less. In other embodiments, the time is at least about 15% less, 20% less, 25% less, 30% less, 35% less, 40% less, 50% less, 60% less, 70% less, 80% less, or 90% less. In some embodiments, the time is at least 50% less. The Examples below describe how to measure the reduction in polymerization times and monitor molecular weights by measuring agitator torque and speed versus time during the polymerization process. Molecular weight may also be monitored by measuring solution intrinsic viscosity and melt viscosity according to known methods. In some embodiments, the disclosed methods are capable of providing chain-extended condensation polymers having higher molecular weights than is possible using conventional methods of forming condensation polymers in the absence of the disclosed chain extenders.

Similarly, the methods are capable of achieving certain solution intrinsic viscosities of the chain-extended condensation polymers in reduced times. In some embodiments, a solution intrinsic viscosity of at least about 0.6 dL/g of the chain-extended condensation polymer is achieved in a time of no more than about 90 minutes. This includes embodiments in which the time is no more than about 85 minutes, no more than about 80 minutes, no more than about 75 minutes, or no more than about 70 minutes.

The reduction in polymerization times has a number of important advantages. First, by reducing polymerization times, the efficiency and capacity of polymerization plants employing the disclosed methods are greatly increased, resulting in significant cost savings. As further discussed in the Examples below, the capacity of a typical polymerization plant running under typical conditions may be increased by at least about 10%, 20%, 30%, 40%, 50%, or even more, using the disclosed methods. Second, by reducing polymerization times, it is possible to avoid the polymer degradation, poor application performance, and poor finished part appearance typically associated with polymers formed using conventional methods having long reaction times and high temperatures. Finally, because in-reactor chain extension is capable of providing chain-extended condensation polymers having high molecular weights, further processing of the chain-extended polymers using expensive and cumbersome solid state polymerization (SSP) may be eliminated.

However, for those embodiments in which the chain-extenders are further processed using SSP, the methods are also capable of reducing the SSP polymerization times for the processed, chain-extended condensation polymers as compared to the SSP polymerization times for the processed, condensation polymer formed in the absence of the chain extenders. Thus, using the disclosed methods, it is possible to achieve a molecular weight of the processed, chain-extended condensation polymer in a time that is less than the time to achieve the molecular weight in the absence of the chain extender. In some embodiments, the time is at least about 5% less. In other embodiments, the time is at least about 10%, 15%, 20% less, or more. The Examples below describe how to measure the reduction in SSP times and monitor molecular weights by measuring solution intrinsic viscosity.

Similarly, the methods are capable of achieving certain solution intrinsic viscosities of the processed, chain-extended condensation polymers in reduced times. In some embodiments, a solution intrinsic viscosity of at least about 0.8 dL/g of the processed, chain-extended condensation polymer is achieved in a time of 15 hours or less. This includes embodiments in which the time is about 14 hours, 13 hours, 12 hours, or less.

Chain-Extended and Processed, Chain-Extended Condensation Polymers

Also provided are the chain-extended and processed, chain-extended condensation polymers formed by the disclosed methods. These polymers exhibit a number of desirable characteristics. For those methods which produce chain-extended condensation polymers having a significant amount of branching, changes in the mechanical and thermal properties of such polymers would be expected. However, as further described in the Examples below, it has been discovered that the mechanical and thermal properties of such polymers are not negatively affected as compared to condensation polymers formed in the absence of the disclosed chain extenders.

In addition, the chain-extended condensation polymers have advantageous rheological properties. As further described in the Examples below, in some embodiments, the chain-extended condensation polymers exhibit a greater melt viscosity than a condensation polymer formed in the absence of the chain extenders. In some such embodiments, the melt viscosity is at least about 1.5 times greater, at least about 2 times greater, or even more. In other embodiments, the chain-extended condensation polymers exhibit a higher viscosity at low shear rates and a lower viscosity at high shear rates than the condensation polymer formed in the absence of the chain extender. In some such embodiments, the chain-extended condensation polymer exhibits a higher viscosity at shear rates below about 400 $s^{-1}$, 300 $s^{-1}$, 200 $s^{-1}$, or less, and a lower viscosity at shear rates above about 300 $s^{-1}$, 400 $s^{-1}$, 500 $s^{-1}$ or more. This characteristic may lead to improved processability of the chain-extended condensation polymers as compared to conventional condensation polymers since they would be expected to demonstrate low viscosity during extrusion, blow, and injection molding, but higher viscosity during low shear handling. The chain extended condensation polymers also exhibit higher elasticity, increased die swell, increased stretch-ability during blow molding, higher melt tension, higher extensional viscosity, lower elastic modulus maintaining tensile strength and higher elongation at break (i.e. higher toughness). This allows for faster processing during article manufacturing via injection-blow molding, extrusion-blow molding, sheet thermoforming, mono-oriented film, bi-oriented film, and fiber spinning.

Also provided are articles formed from any of the disclosed chain-extended and processed, chain-extended condensation polymers. Such articles include, but are not limited to food or non-food contact containers, films, coatings, tapes, moldings, fibers, strapping, and other consumer products.

As will be understood by one skilled in the art, for any and all purposes, particularly in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," "greater than," "less than," and the like include the number recited and refer to ranges which can be subsequently broken down into subranges as discussed above. Finally, as will be understood by one skilled in the art, a range includes each individual member.

The use of the terms "a" and "an" and "the" and similar referents in the context of describing the elements (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the embodiments and does not pose a limitation on the scope of the claims unless otherwise stated. No language in the specification should be construed as indicating any non-claimed element as essential to the practice of the invention.

Additionally the phrase "consisting essentially of" will be understood to include those elements specifically recited and those additional elements that do not materially affect the basic and novel characteristics of the claimed invention. The phrase "consisting of" excludes any element not specifically specified. In addition, where features or aspects of the disclosure are described in terms of Markush groups, those skilled in the art will recognize that the disclosure is also thereby described in terms of any individual member or subgroup of members of the Markush group.

As used herein, "about" will be understood by persons of ordinary skill in the art and will vary to some extent depending upon the context in which it is used. If there are uses of the term which are not clear to persons of ordinary skill in the art, given the context in which it is used, "about" will mean up to plus or minus 10% of the particular term.

All publications, patent applications, issued patents, and other documents referred to in this specification are herein incorporated by reference as if each individual publication, patent application, issued patent, or other document was specifically and individually indicated to be incorporated by reference in its entirety. Definitions that are contained in text incorporated by reference are excluded to the extent that they contradict definitions in this disclosure.

The present invention, thus generally described, will be understood more readily by reference to the following examples, which are provided by way of illustration and are not intended to be limiting of the present invention.

EXAMPLES

The following abbreviations are used: GMA is glycidyl methacrylate; STY is styrene; BA is butyl acrylate; 2-EHA is 2-ethylhexyl acrylate; and MMA is methyl methacrylate.

In-reactor Chain Extension of Poly(Ethylene Terephthalate) (PET)

Chain Extenders: Four epoxy functional chain extenders were produced using high temperature free radical continuous polymerization (SGO) as described above. The characterization details for these chain extenders are shown in Table 3.

TABLE 3

Chain Extender Characterization Details.

| Chain Extender | $M_n{}^a$ | $M_w{}^a$ | GMA (%) | STY (%) | BA (%) | 2-EHA (%) | MMA (%) | $EEW^b$ (g/eq) | $T_g{}^c$ (°C.) | Functionality$^d$ $F_n$ (epoxy/chain) | $F_w$ |
|---|---|---|---|---|---|---|---|---|---|---|---|
| Chain Extender 1 | 2,246 | 6,791 | 49.0 | 50.0 | — | — | 1.0 | 285 | 55 | 7.9 | 23.8 |
| Chain Extender 2 | 2,301 | 5,379 | 32.0 | 67.0 | — | — | 1.0 | 445 | 59 | 5.2 | 12.1 |
| Chain Extender 3 | 2,040 | 6,139 | 30.3 | — | 68.6 | 1.1 | — | 453 | −37 | 4.5 | 13.6 |
| Chain Extender 4 | 1,589 | 3,324 | 31.6 | — | 67.2 | 1.2 | — | 456 | −41 | 3.5 | 7.3 |

$^a$SEC molecular weight relative to polystyrene standards.
$^b$Epoxy equivalent weight (EEW) determined using perchloric acid titration method P-2-164.
$^c$DSC value defined as the midpoint of the first heat.
$^d$Calculated average functionality based on SEC molecular weight and titrated epoxy equivalent weight (MW/EEW).

The molecular weights were measured using size exclusion chromatography (SEC) and are relative to polystyrene standards. The compositions were estimated using a mass balance approach and were based on the gas chromatography (GC) characterization of the polymerization feed, distillate, and resin residuals. The epoxy equivalent weights were determined using a perchloric acid titration method based on ASTM D 1652-90. The glass transition temperatures were measured using differential scanning calorimetry (DSC) and were defined as the midpoint of the first heating cycle. The number and weight average functionality per chain (Fn and Fw) were calculated by dividing the SEC number and weight average molecular weights (Mn and Mw) by the epoxy equivalent weight.

Due to their designed characteristics, namely, monomer compositions, and SEC molecular weight averages, which, in turn, define a Glass Transition Temperature (Tg) for the copolymers obtained, the chain extenders are chemically functionalized polymers that may be solid or liquid at room temperature. As examples, Chain Extender 1 and Chain Extender 2 have a monomer composition and SEC molecular weight averages that make them solid at room temperature (Tg>25° C.). Alternatively, copolymers with a low Tg (Tg<25° C.) may be prepared, resulting in liquid polymeric chain extenders. When the Tg and molecular weights are sufficiently low (i.e. Tg<−40° C. and Mw<10,000) the liquid chain extenders exhibit low viscosity at room temperature. For example, Chain Extenders 3 and 4 were designed with similar functionality to the two solid materials, Chain Extender 2 and Chain Extender 1, while having sufficiently low viscosity to be handled as liquids. Chain Extenders 3 and 4 were designed to maximize the balance of molecular weight, functionality, and viscosity. The ability of the chain extenders to be designed as solid or liquids gives additional advantages in the implementation of the proper feed stream for the chain extenders to be used in this in-reactor chain extension of polycondensates.

In some embodiments, the chain extenders may be added to the esterification or melt polymerization reactor system as a solid to the proper solid addition port to prevent breaking vacuum in the esterification or melt polymerization reactor. In other embodiments, liquid chain extenders may be added or pumped into the melt polymerization or esterification reactors with conventional pumping equipment known in the art, without the need for the use of dilution solvents, which may be undesirable in the reaction mix.

In some embodiments, the chain extenders may be added, either solid or liquid, as a solid concentrate (masterbatch) in a suitable plastic carrier. Using the same polycondensation polymer as a carrier in these concentrates avoids the introduction of foreign substances to the reactor system. In some embodiments, the chain extender is added, either solid or liquid, as a liquid dilution (liquid solution or liquid masterbatch) in a suitable liquid carrier. Using some liquid components in the system, such as monomers or reaction solvents, or reaction additives, as a liquid carrier in these liquid concentrates avoids introduction of foreign substances to the reactor system.

In-reactor Chain Extension: In-reactor chain extension includes adding one of the chain extenders, such as those exemplified and described in Table 3, during the polymerization process of PET or other polycondensate. Specifically, the chain extenders were added during the polycondensation stage of the batch polymerization process shown in Equation 2 of Scheme 1 at a predetermined time. The time was defined using a well-defined agitator torque, viscosity relationship, when the PET was at an SIV of 0.4 dL/g. The experiments are summarized in Table 4. With the exception of Example 3, the polymerizations were terminated at an SIV of 0.6 dL/g. Chain extender addition was accomplished using a pressurized stainless steel addition vessel having ball valves at both ends. In the case of the solid chain extenders the granules were charged to the vessel, purged with nitrogen, and cooled to prevent melting during addition. The addition vessel was attached to the top of the reactor, a nitrogen line attached to the top ball valve, and pressurized. The reactor vacuum evacuated the vessel contents when the bottom ball valve was opened at the time of addition. The ball valve was held open for sixty seconds, closed, and the top valve was opened to pressurize the vessel. After closing the top valve, the bottom valve was again opened to evacuate any remaining chain extender. In the case of the liquid chain extenders, the liquids were heated for one hour prior to addition to reduce viscosity.

TABLE 4

In-reactor Chain Extension Experimental Summary.

| Example # | Chain Extender | Level (%, w/w) | Polymerization $SIV^a$ (dL/g) | SSP $SIV^b$ (dL/g) |
|---|---|---|---|---|
| Control | NA; Control | NA | 0.600 | 0.811 |
| 1 | Chain Extender 1 | 0.10 | 0.601 | 0.809 |

TABLE 4-continued

In-reactor Chain Extension Experimental Summary.

| Example # | Chain Extender | Level (%, w/w) | Polymerization SIV[a] (dL/g) | SSP SIV[b] (dL/g) |
|---|---|---|---|---|
| 2 | Chain Extender 1 | 0.20 | 0.603 | 0.808 |
| 3 | Chain Extender 1 | 0.20 | 0.720 | 0.840 |
| 4 | Chain Extender 2 | 0.31 | 0.597 | 0.825 |
| 5 | Chain Extender 3 | 0.32 | 0.595 | 0.779 |
| 6 | Chain Extender 4 | 0.32 | 0.603 | 0.770 |

[a]solution intrinsic viscosity measured following polycondensation.
[b]solution intrinsic viscosity measured after solid state polymerization.
NA—not applicable.

All materials were crystallized and solid state polymerized to molecular weights sufficient for sheet and bottle production. As further described below, the melt and solid state polymerization times were monitored and used as a measure of production efficiency. The SSP times for Examples 5 and 6 are not directly comparable to the other polymerizations, due to an equipment change prior to Example 5.

With reference to Table 4, the Control Example was a linear PET control not subjected to chain extension. The outcomes of all subsequent experimentation were compared to the Control Example. Examples 1 and 2 used low and moderate chain extender concentrations, respectively, designed to define the typical polymerization time reduction that may be associated with Chain Extender 1 in-reactor chain extension. Decreased polymerization times may be used to increase plant efficiencies. Example 3 was identical to Example 2 but polymerized to an SIV of about 0.700 dL/g, typical of that required for PET sheet. Such a polymer eliminates the need for any further costly SSP. Example 4 involved the substitution of Chain Extender 1 with the lower functional Chain Extender 2 at equal epoxy equivalence. Lower functionality was expected to reduce haze associated with excessive branching or gel. Example 5 involved the same experiment as Example 4 using the liquid chain extender Chain Extender 3, which is equivalent to Chain Extender 2 in terms of molecular weight and functionality. The liquid chain extender was void of styrene monomer to increase food contact approval. Example 6 involved the same experiment as Example 5, using the lower molecular weight liquid chain extender Chain Extender 4.

Figure 2:
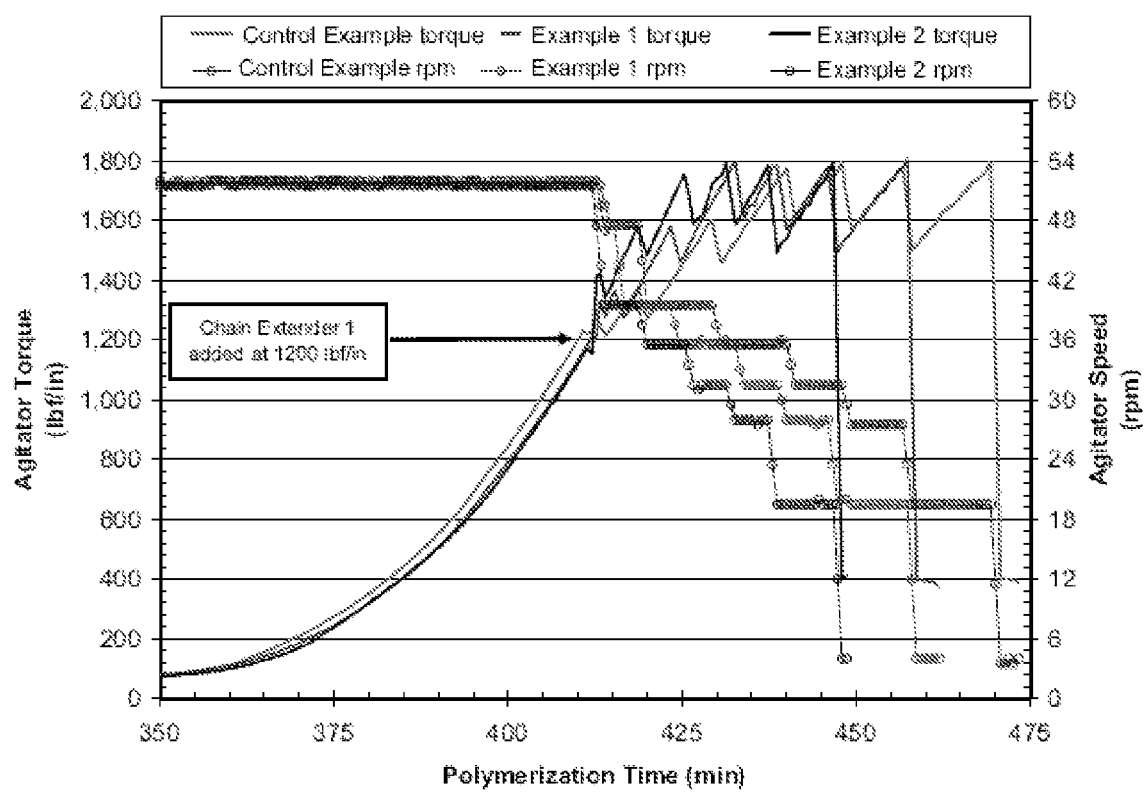
FIG. 2 shows representative agitator torque, speed, and melt polymerization time traces for Control Example, Example 1, and Example 2 chain-extended PET. The addition of the chain extender Chain Extender 1 has been indicated in the plot. For the Control Example control PET, PET pellets were introduced in the place of Chain Extender 1.
Figure 3:
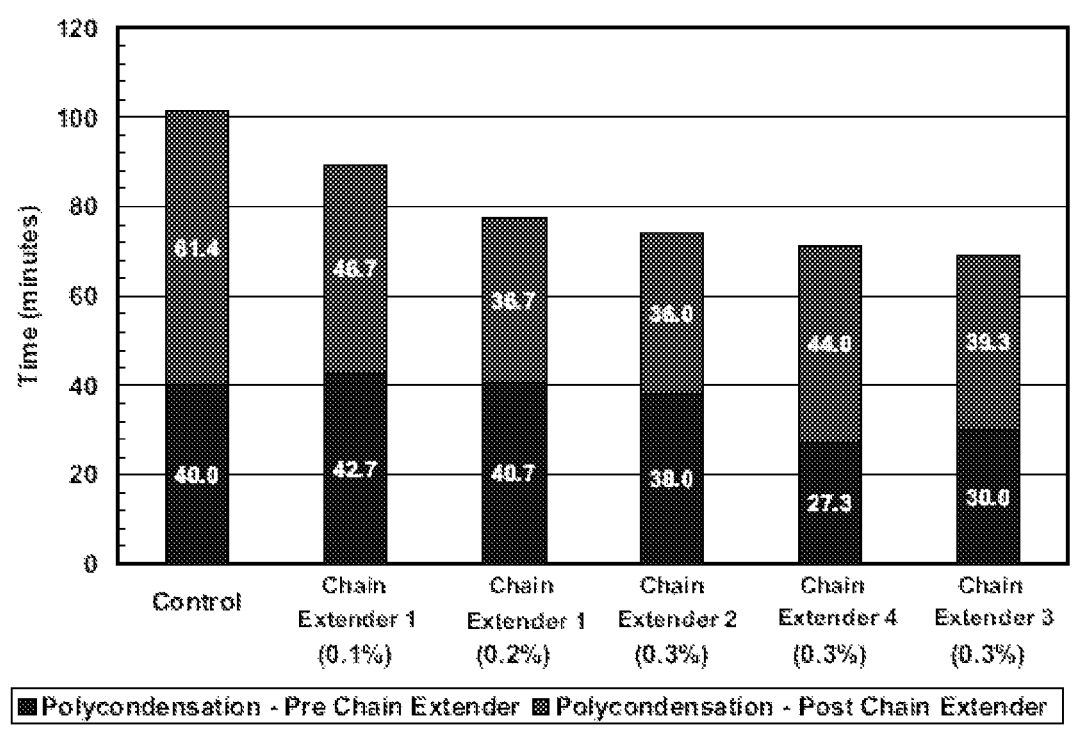
FIG. 3 shows the reduction in melt polymerization times associated with in-reactor chain extension for a variety of chain extenders, according to some embodiments.

Melt Polymerization Results: Standard practice in the batch polymerization of PET is to measure agitator torque with time at constant speed to monitor molecular weight change. Agitator torque and speed traces versus polymerization time for Control Example, Example 1, and Example 2 are shown in FIG. 2. The addition of Chain Extender 1 at 1200 lbf/in and 52 rpm has been highlighted. The saw tooth pattern in the torque traces was due to agitator speed reduction seen in the stair step pattern in the speed traces. The polymerizations were terminated at 1800 lbf/in at 20 rpms, corresponding to a SIV of 0.6 dL/g. As used herein lbf is an abbreviation for pounds-force with 1 lbf equal to 4.45 Newtons. A significant reduction in polymerization time was observed in both the agitator torque and speed traces. That is, the saw tooth and stair step pattern is offset to shorter times for the Example 1 and Example 2 when compared to Control Example. The offset of the Example 2 traces is greater than Example 1. The actual reduction in polymerization time has been summarized in FIG. 3.

Three conclusions may be drawn from this data. First, a significant polymerization time savings can be realized using very little chain extender (≤0.3%). Second, when used at equal epoxy equivalents Chain Extenders 1 and 2 perform similarly. Third, the liquid chain extenders (Chain Extenders 3 and 4) are not as efficient as their solid counterparts when used at equal epoxy equivalents. This may be due to changes in reaction kinetics. It has been determined that butyl acrylate based chain extenders react much slower with carboxylic acid groups than those containing styrene (data not shown). Differential scanning calorimetry (DSC) traces for Chain Extender 1 and a butyl acrylate, glycidyl methacrylate copolymer mixed with octanoic acid were obtained. Chain Extender 1 and octanoic acid was blended to make a paste, placed into a DSC sample pan, and heated. The same procedure was used for the liquid chain extender and yielded a clear viscous liquid. The reaction exotherm for the Chain Extender 1, octanoic acid blend occurred thirty degrees lower than the liquid oligomer, suggesting that styrene based chain extenders are approximately eight times more reactive than those based on butyl acrylate. This trend agrees with the decreased chain extender efficiency observed for the liquid chain extenders (data not shown).

Figure 4:
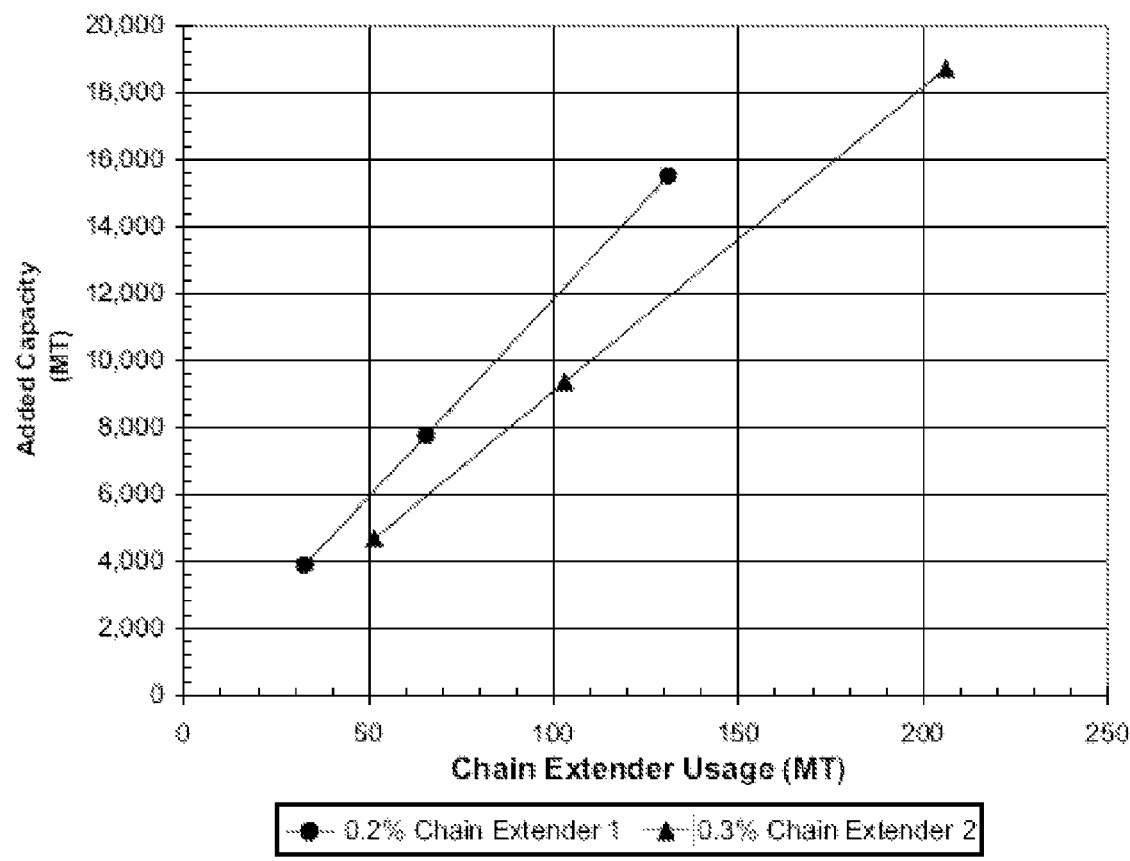
FIG. 4 shows the capacity improvements associated with the use of Chain Extenders 1 and 2. The chain extenders were used at 0.3 and 0.2% (w/w), respectively and the calculations apply to a 50,000 MT/a batch plant run in parallel.

As described above, the disclosed in-reactor chain extension methods are expected to increase the capacity of polymerization plants employing the methods. FIG. 4 shows that 30 to 40% added capacity could be realized when Chain Extenders 1 and 2 are used at 0.3 and 0.2% (w/w), respectively. The calculations apply to a 50,000 MT/yr batch polymerization where Stage 1 and Stage 2 are performed in separate reactors run in parallel. As used herein, MT is an abbreviation for thousand tons. As defined the rate limiting step in this process is the polycondensation step.

Figure 5:
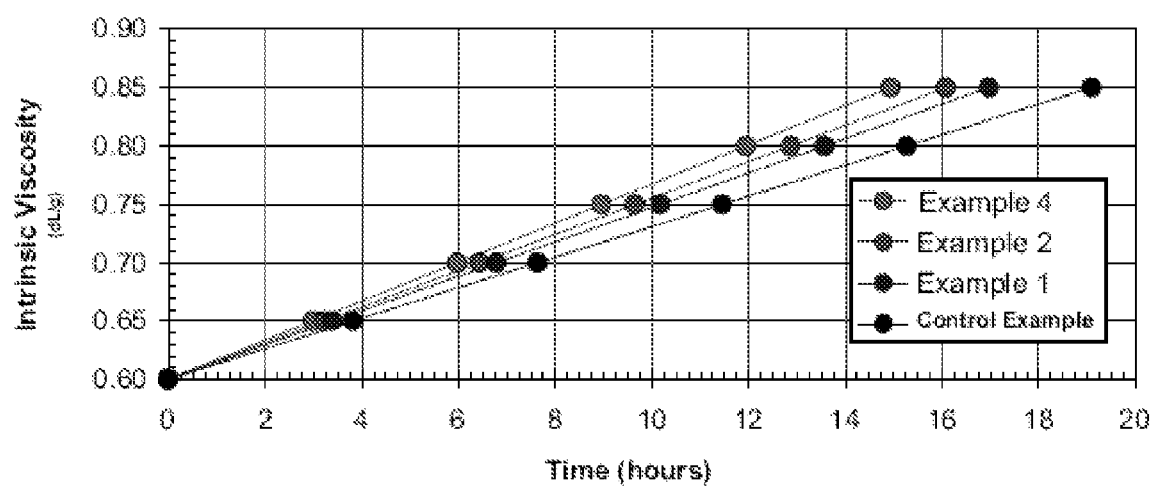
FIG. 5 shows the reduction in solid state polymerization time for a variety of chain-extended PETs compared to a PET formed in the absence of a chain extender (Control Example), according to some embodiments. Results have been normalized to a starting IV equal to 0.600 dL/g.

Solid State Polymerization Results: Once the desired molecular weight was achieved in the melt polymerization reactor the contents were extruded and pelletized. The amorphous pellets were transferred to a rotary vacuum dryer and slowly heated to above their $T_g$ ($T_{max}$=130° C.) under vacuum for drying and crystallization to occur. At the completion of this step, SSP was begun where the crystallized pellets were further heated ($T_{max}$=220° C.) under very high vacuum. In this study all materials were SSP to an SIV of 0.8 dL/g. FIG. 5 summarizes the results for Control Example, Example 1, Example 2, and Example 4. The data shown in this figure were normalized to a starting SIV equal to 0.6 dL/g. Similar to the melt polymerization results, SSP times were reduced and large capacity improvements could be realized using in-reactor chain extension and/or by introducing the chain extenders prior to SSP.

Figure 6:
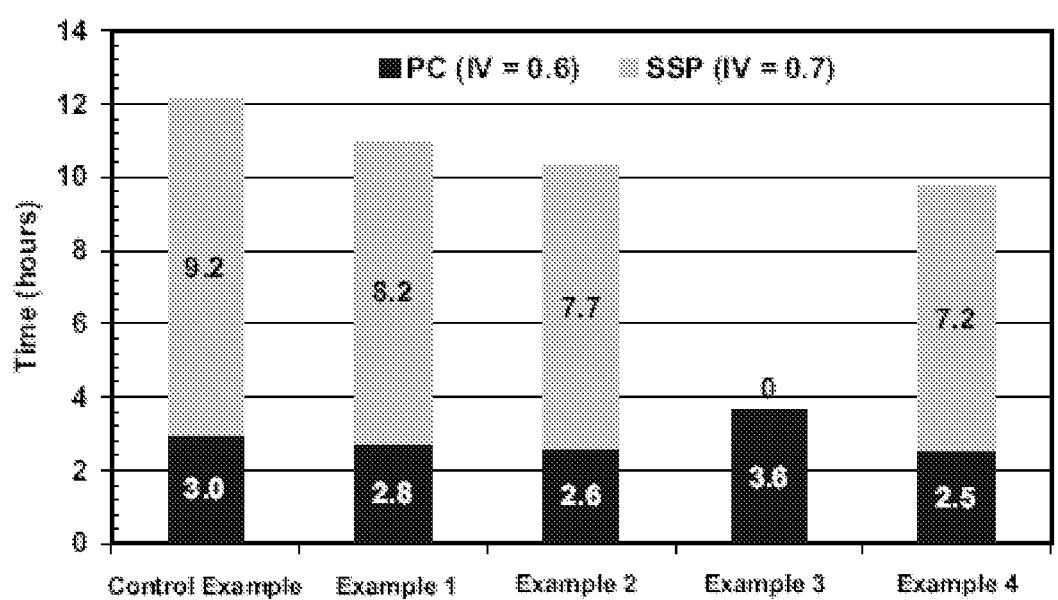
FIG. 6 shows the total production time (melt and solid state polymerization) required to prepare poly(ethylene terephthalate) having an intrinsic viscosity of 0.7 dL/g, according to one embodiment.
Figure 7:
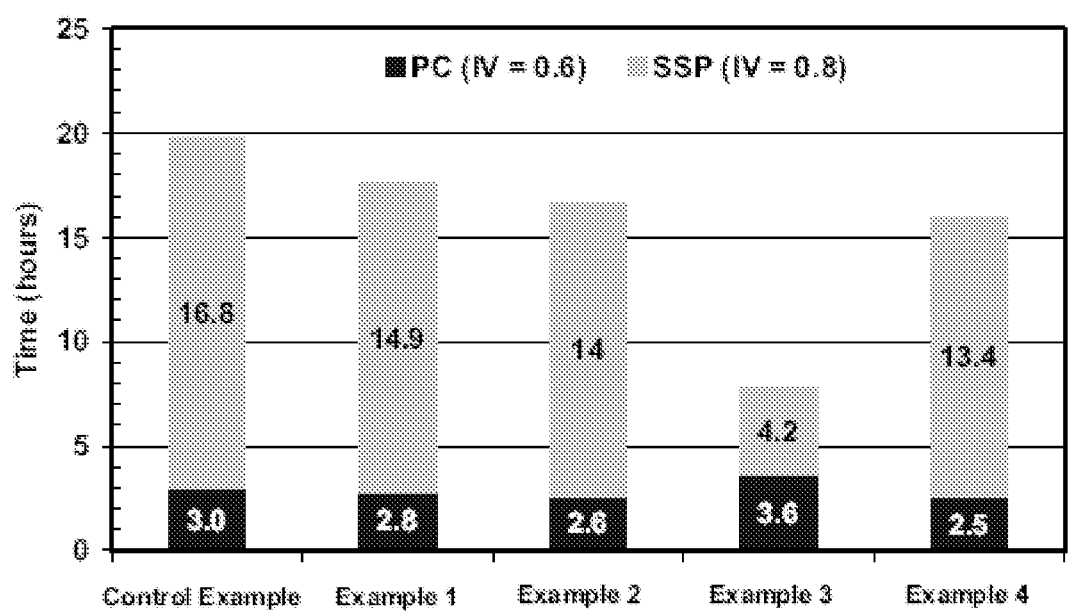
FIG. 7 shows the total production time (melt and solid state polymerization) required to prepare poly(ethylene terephthalate) having an intrinsic viscosity of 0.8 dL/g, according to one embodiment.
Figure 8:
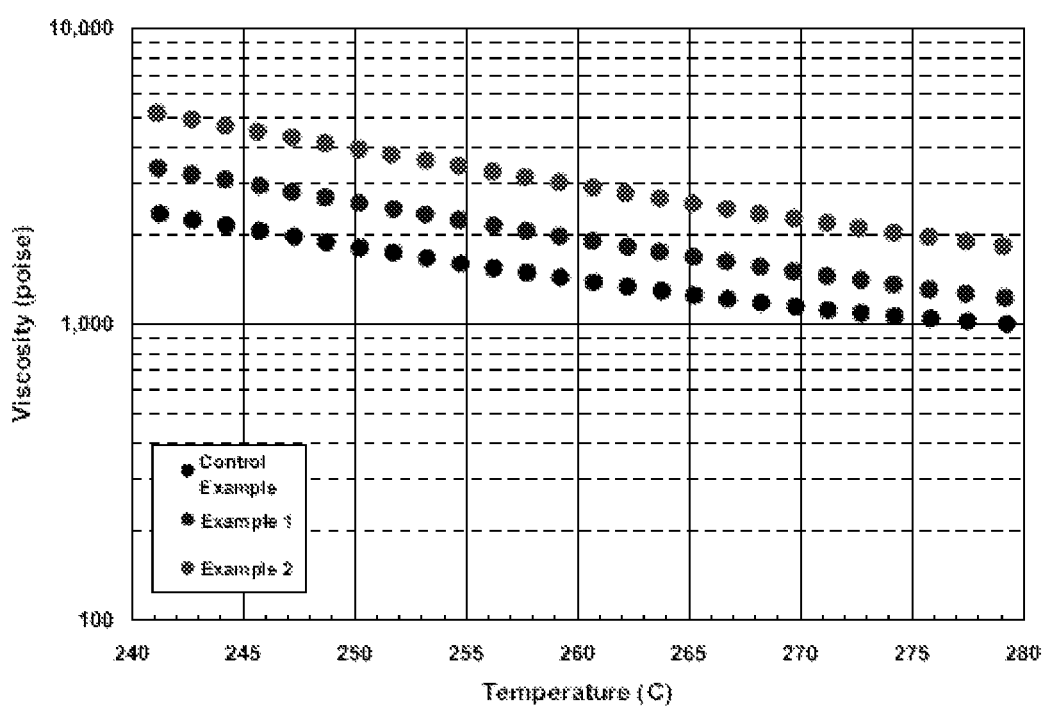
FIG. 8 shows the melt viscosity for Control Example, Example 1, and Example 2. Viscosity was measured prior to solid state polymerization at a SIV of 0.6 dL/g. Measurements were made using a cone and plate viscometer at 6.3 s$^{-1}$.

Overall Processing Results: Combining the melt and sold state polymerization time illustrates the overall process time advantage associated with in-reactor chain extension. FIGS. 7 and 8 summarize the total process time to prepare 0.7 and 0.8 dL/g grade PET, respectively. The time advantages illustrated in FIG. 6 could be applied to the preparation of fiber, film, and low end sheet (see Table 2). Notably, in the Example 3 example, the PET was polymerized to an IV=0.7 dL/g in the melt reactor, completely eliminating the need for SSP. Similar process advantages are shown in FIG. 7 for PET used in higher end applications.

Effect on Material Properties: As described above, the chain extenders used in this study would be expected to introduce a significant amount of polymer branching. Surprisingly, no negative effects on the mechanical and thermal properties of the chain extended PET were observed. The effects of in-reactor chain extension on mechanical and thermal properties were evaluated in a water bottle injection blow molded study. It was found that in-reactor chain extension did not affect the axial or radial water bottle tensile properties, degree of crystallinity, or rate of crystallization.

However, branching of the chain extended PET did appear to affect polymer rheology. The melt viscosity of Control Example, Example 1, and Example 2 was studied and the results are shown in FIG. 8. The SIV for each of the materials was measured to be approximately 0.6 dL/g (see Table 4, column 5). The viscosity traces were obtained using a cone and plate viscometer at 6.3 s$^{-1}$. At all temperatures, the viscosity of the chain extended materials were measured to be greater than the control. More specifically, the viscosity of Example 2 was twice that of Control Example at the similar SIV.

Solution intrinsic viscosity is a measure of the hydrodynamic volume of non-interacting polymer spheres (i.e., infinite dilution) where polymer-solvent interactions are important. Whereas, melt viscosity is highly dependent upon polymer-polymer interactions. It is easy to imagine a set of linear and branched materials that have similar hydrodynamic radii and dilute solution behavior (e.g., Control Example and Example 2). However, under bulk conditions the branched species having more points of interaction would demonstrate higher low shear viscosity as shown in FIG. 8.

Figure 9:
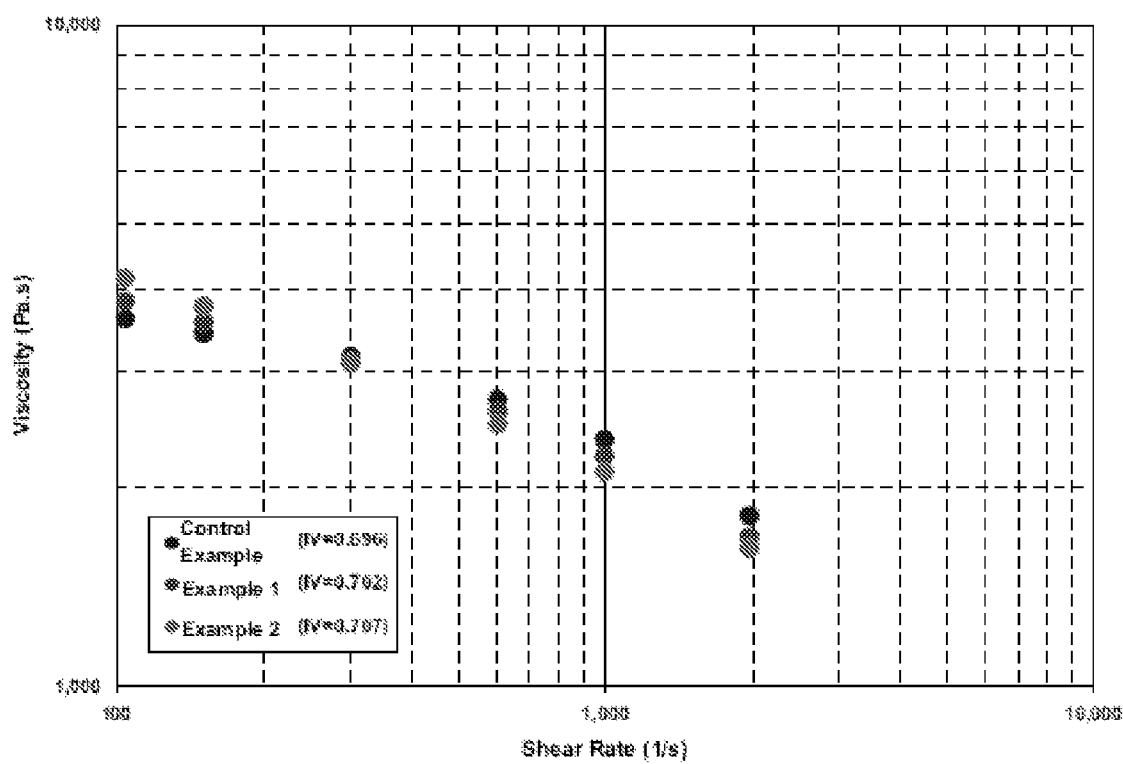
FIG. 9 shows the shear rate dependent viscosity for Control Example (IV=0.713 and 0.696 dL/g); Example 1 (IV=0.702 dL/g); and Example 2 (IV=0.707 dL/g). The capillary viscosity was measured at 280° C. from high shear rate to low.

Viscosity at shear rates typically experienced during extrusion and low end blow and injection molding have been shown in FIG. 9. Consistent with the melt viscosity results shown in FIG. 8, higher viscosity was observed for the chain extended materials (Example 1 and Example 2) at low shear rates. At approximately 300 s$^{-1}$ a viscosity cross over was observed. The crossover indicates that the polymer-polymer interactions that dominate low shear viscosity can be disturbed under relatively mild conditions, suggesting weak interactions. This provides some insight into the processability of the chain-extended materials. The chain-extended materials may demonstrate low viscosity during extrusion, blow, and injection molding, but higher viscosity during low shear handling, resulting in improved processability.

While certain embodiments have been illustrated and described, it should be understood that changes and modifications can be made therein in accordance with ordinary skill in the art without departing from the invention in its broader aspects as defined in the following claims.

What is claimed is:

1. A method comprising:
adding a chain extender during the polymerization process of a condensation polymer to provide a chain-extended condensation polymer, wherein the chain extender comprises a polymerization product of
at least one functional (meth)acrylic monomer, and
at least one styrene monomer, substituted styrene monomer, (meth)acrylic monomer, or a mixture of any two or more thereof;
wherein: the chain extender is added from about 0.1% to about 0.32% by weight of the total weight of the chain extender and the components of the condensation polymer; and the condensation polymer is polyethyleneterephthalate.

2. The method of claim 1, wherein the chain extender has a functionality of 2 or more.

3. The method of claim 1, wherein the chain extender has a functionality of greater than 2.

4. The method of claim 1, wherein the functional (meth)acrylic monomer is an epoxy-functional (meth)acrylic monomer.

5. The method of claim 4, wherein the epoxy-functional (meth)acrylic monomer is glycidyl methacrylate.

6. The method of claim 1, wherein the styrene monomer is styrene and the (meth)acrylic monomer is butyl acrylate, 2-ethylhexyl acrylate, or methyl (meth)acrylate.

7. The method of claim 1, wherein a solution intrinsic viscosity of at least about 0.6 dl/g of the chain-extended condensation polymer is achieved in a time of no more than about 90 minutes.

8. The method of claim 1, wherein the method does not comprise processing the chain-extended condensation polymer via solid state polymerization.

9. A method comprising:
adding a chain extender during the polymerization process of a polyester to provide a chain-extended polyester, wherein the chain extender comprises a polymerization product of
at least one epoxy-functional (meth)acrylic monomer, and
at least one styrene monomer, substituted styrene monomer, (meth)acrylic monomer, or a mixture of any two or more thereof;
wherein:
the polymerization process is a batch polymerization process or a continuous polymerization process;
the chain extender is added when the solution intrinsic viscosity of the condensation polymer is no more than about 0.6 dL/g; and
a molecular weight of the chain-extended condensation polymer is achieved in a time that is less than the time to achieve the molecular weight in the absence of the chain extender;
the chain extender is added from about 0.1% to about 0.32% by weight of the total weight of the chain extender and the components of the polyester; and
the polyester is polyethyleneterephthalate.

10. The method of claim 9, wherein the chain-extended condensation polymer exhibits a greater melt viscosity than a condensation polymer formed in the absence of the chain extender.

11. A chain-extended condensation polymer formed by method of claim 1.

* * * * *